(12) United States Patent
Kim et al.

(10) Patent No.: US 8,455,138 B2
(45) Date of Patent: Jun. 4, 2013

(54) ANODE AND LITHIUM BATTERY INCLUDING THE ANODE

(75) Inventors: Gue-sung Kim, Yongin-si (KR); Jin-hwan Park, Seoul (KR)

(73) Assignee: Samsung SDI Co., Ltd., Yongin-si (KR)

(*) Notice: Subject to any disclaimer, the term of this patent is extended or adjusted under 35 U.S.C. 154(b) by 1326 days.

(21) Appl. No.: 11/515,096

(22) Filed: Sep. 1, 2006

(65) Prior Publication Data

US 2007/0059600 A1 Mar. 15, 2007

(30) Foreign Application Priority Data

Sep. 13, 2005 (KR) .................... 10-2005-0085190

(51) Int. Cl.
| | |
|---|---|
| *H01M 4/13* | (2010.01) |
| *H01M 4/62* | (2006.01) |
| *H01M 4/58* | (2010.01) |
| *H01M 4/56* | (2006.01) |
| *H01M 4/36* | (2006.01) |
| *H01M 4/66* | (2006.01) |

(52) U.S. Cl.
USPC ... 429/217; 429/231.95; 429/232; 429/218.1; 429/225; 429/226; 429/245

(58) Field of Classification Search
USPC ............... 429/217, 231.95, 232, 218.1, 225, 429/226, 245
See application file for complete search history.

(56) References Cited

U.S. PATENT DOCUMENTS

| | | | |
|---|---|---|---|
| 6,225,003 B1 | 5/2001 | Krawiec et al. | |
| 6,399,246 B1 | 6/2002 | Vandayburg et al. | |
| 6,416,902 B1 * | 7/2002 | Miyasaka | 429/223 |
| 6,555,268 B1 | 4/2003 | Inoue et al. | |
| 2002/0192565 A1 * | 12/2002 | Ueda et al. | 429/331 |
| 2003/0087152 A1 | 5/2003 | Shindo et al. | |
| 2004/0023117 A1 * | 2/2004 | Imachi et al. | 429/231.95 |
| 2005/0142440 A1 * | 6/2005 | Yamaki et al. | 429/209 |
| 2005/0158624 A1 | 7/2005 | Park et al. | |

FOREIGN PATENT DOCUMENTS

| | | |
|---|---|---|
| CN | 1641916 A | 7/2005 |
| JP | 04-039857 | 2/1992 |
| JP | 08-306391 | 11/1996 |
| JP | 09-219188 | 8/1997 |
| JP | 09-259869 | 10/1997 |
| JP | 2003-168429 | 6/2003 |
| JP | 2005-011696 | 1/2005 |
| JP | 2005-063805 | 3/2005 |
| KR | 10-1999-000506 | 1/1999 |
| KR | 10-2000-0067311 | 11/2000 |
| WO | WO 2005/067081 A1 | 7/2005 |

OTHER PUBLICATIONS

Office action, and English translation, dated Feb. 15, 2008, for corresponding Chinese Patent Application No. 2006101518649.
Registration Determination Certificate dated Sep. 9, 2009, with Letters Patent and English translation of Letters Patent, for corresponding Chinese Patent Application No. 200610151864.9.
KIPO Registration Determination Certificate dated May 26, 2007, for Korean priority Patent application 10-2005-0085190.
English machine translation of Japanese Publication No. 08-306391 listed above 45 pages.
English machine translation of Japanese Publication No. 09-219188 listed above 54 pages.
English machine translation of Japanese Publication No. 09-259869 listed above 40 pages.
English machine translation of Japanese Application No. 2003-168429 listed above 54 pages.
English machine translation of Japanese Application No. 2005-011696 listed above 65 pages.
English machine translation of Japanese Application No. 2005-063805 listed above 28 pages.

* cited by examiner

*Primary Examiner* — Eugenia Wang
(74) *Attorney, Agent, or Firm* — Christie, Parker & Hale, LLP

(57) ABSTRACT

An anode including: an anode active material; a first binder coating layer formed on the anode active material; a second binder coating layer formed on the first binder coating layer; and a collector, wherein the first binder coating layer has an elasticity higher than the second binder layer and the second binder coating layer is adapted to combine the anode active material with the collector. In the anode, the first binder coating layer that has the relatively high elasticity on the anode active material can tolerate a change in volume of the anode active material. Therefore, a lithium battery that uses the anode has improved cyclic properties and a relatively long lifespan.

18 Claims, 4 Drawing Sheets

ANODE AND LITHIUM BATTERY INCLUDING THE ANODE

CROSS-REFERENCE TO RELATED PATENT APPLICATION

This application claims priority to and the benefit of Korean Patent Application No. 10-2005-0085190, filed on Sep. 13, 2005, in the Korean Intellectual Property Office, the entire content of which is incorporated herein by reference.

BACKGROUND OF THE INVENTION

1. Field of the Invention

The present invention relates to an anode and a lithium battery including the anode, and more particularly, to an anode capable of tolerating a change in volume of an anode active material and a lithium battery with improved cyclic properties including the same.

2. Description of the Related Art

Non-aqueous electrolyte secondary batteries that use anodes formed of lithium compounds have relatively high voltages and relatively high energy densities, and have therefore been actively studied. In particular, when interest in lithium as an anode material was developing, lithium metals with large battery capacities were studied. However, in a battery using lithium metal as an anode, a large amount of lithium dendrites can precipitate on the lithium surface when the battery is being charged so that charge/discharge efficiency decreases or the anode becomes short-circuited with a cathode. In addition, lithium by itself is unstable. That is, lithium is susceptible to heat and impacts due to its high reactivity, and is explosive. However, these disadvantages of lithium metal can be overcome by using a carbonaceous anode. A carbonaceous anode is not formed of a lithium metal. That is, in a carbonaceous anode, lithium ions intercalate into and/or deintercalate out of interfaces of crystals of a carbonaceous electrode during charging/discharging and/or during an oxidation/reduction reaction.

However, lithium batteries using carbonaceous anodes have relatively low battery capacities due to the porous structure of carbon. For example, in a case of graphite that has a relatively high crystallinity, a theoretical capacity of $LiC_6$ is 372 mAh/g, while a theoretical capacity of lithium metal is 3860 mAh/g.

It is known that lithium alloys, such as Li—Al, Li—Pb, Li—Sn, and Li—Si, can have larger electric capacities than carbonaceous materials. When these alloys or metals are used alone, however, a precipitation of lithium dendrites may lead to a number of problems as discussed above. Accordingly, in order to increase electric capacity and prevent short-circuiting, these alloys can be appropriately mixed with a carbonaceous material.

However, the mixing of an alloy (or metal) and a carbonaceous material results in another problem. That is, the carbonaceous material and the metal have different volume expansion rates when being oxidized and reduced, and the metal reacts with an electrolyte. Particularly, during charging, lithium ions enter an anode. In this case, the entire volume of the anode increases, and thereby has a denser structure. Then, during discharging, lithium is released from the anode in the form of lithium ions, thereby reducing the volume of the anode material. Here, when the carbonaceous material and the metal contract, due to different expansion rates of the carbonaceous material and the metal, gaps can be formed between the carbonaceous material and the metal, thereby causing an electrical disconnection. As a result, electrons do not flow smoothly, and thus the efficiency of the battery decreases. In addition, during charging/discharging, the metal can react with an electrolyte, thereby reducing the lifespan of the electrolyte and thus reducing the lifespan and efficiency of the battery.

SUMMARY OF THE INVENTION

An aspect of the present invention provides an anode capable of tolerating a change in volume of an anode active material that occurs when the anode active material is charged and discharged.

An aspect of the present invention also provides a lithium battery that includes the anode and thus has improved charged/discharge properties.

According to an embodiment of the present invention, there is provided an anode including: an anode active material; a first binder coating layer formed on the anode active material; a second binder coating layer formed on the first binder coating layer; and a collector, wherein the first binder coating layer has an elasticity higher than the second binder layer, and the second binder coating layer is adapted to combine the anode active material with the collector.

The anode active material may include a metal active material that can form an alloy with lithium.

In the anode, the metal active material may include a metal or metalloid selected from the group consisting of Si, Sn, Al, Ge, Pb, Bi, Sb, and combinations thereof.

The first binder coating layer may include a polymer binder selected from the group consisting of styrene-butadiene rubber (SBR), acrylonitrile-butadiene rubber (NBR), butadiene rubber, isoprene rubber, polysulfide rubber, chloroprene rubber, polyurethane rubber, silicon rubber, ethylene propylene diene methylene (EPDM), acryl-based rubber, fluoroelastomer, and combinations thereof.

The second binder coating layer may include a polymer binder selected from the group consisting of carboxy methyl cellulose, polystyrene glycols, celluloses, poly N-vinyl amides, poly acrylamides, and combinations thereof.

In the anode, the anode active material may include carbon fibers.

In the anode, the first binder coating layer may include carbon fiber.

The anode active material may be a silicon anode active material, the first binder coating layer formed on the anode active material may be a styrene butadiene rubber binder coating layer, the second binder coating layer formed on the first binder coating layer may be a carboxy methyl cellulose binder coating layer, and the collector may be a copper collector.

According to another embodiment of the present invention, there is provided a lithium battery including the anode.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
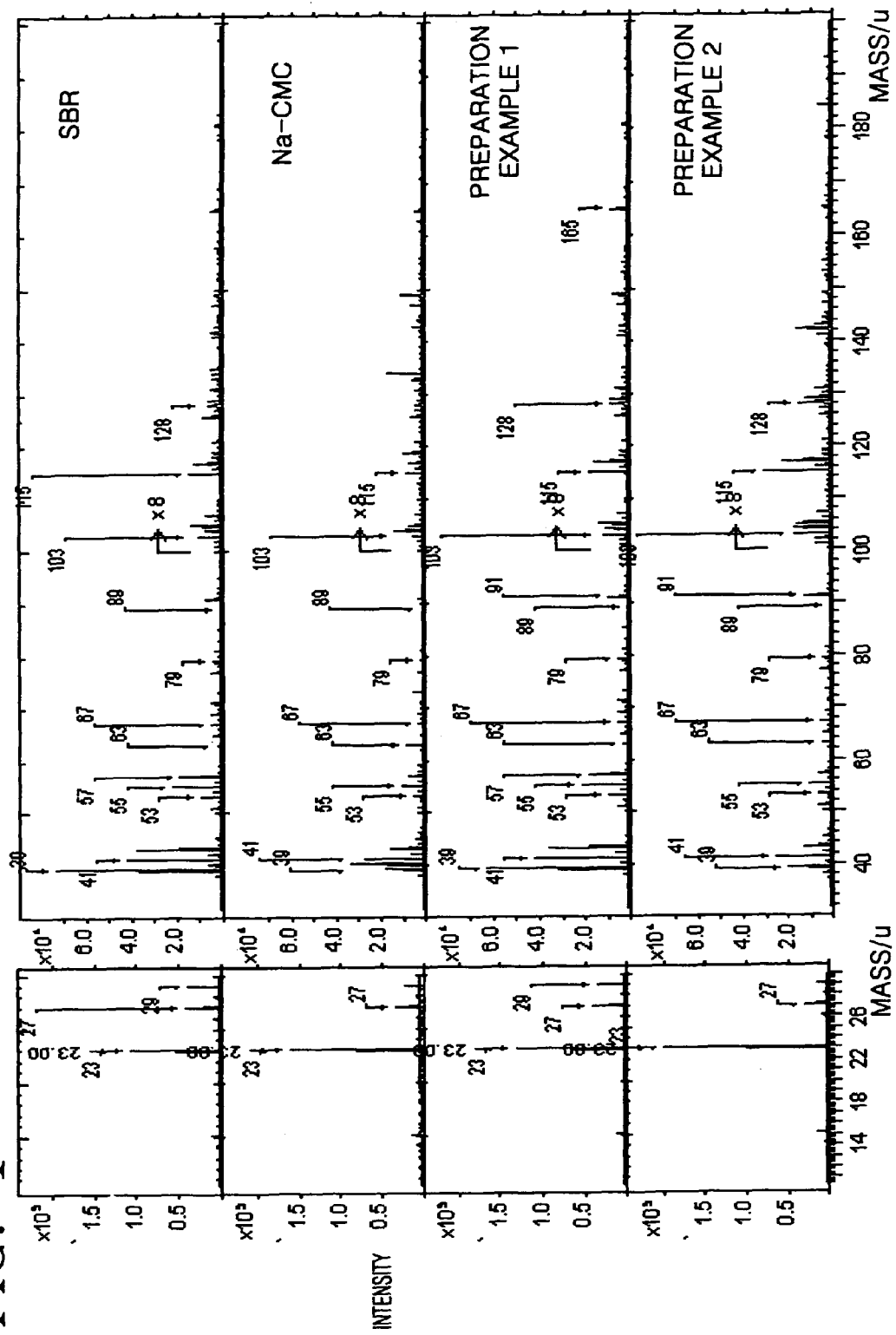
FIG. 1 is a mass spectrograph showing results of a mass spectrometry using TOF-SIMS (cation mode) performed on surfaces of films prepared according to Preparation Examples.

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

An anode according to an embodiment of the present invention includes a binder coating layer having a relatively high elasticity on an anode active material, thereby allowing the anode to tolerate a change in volume of the anode active material. As such, a lithium battery including the anode according to the embodiment has improved cyclic properties and a relatively long lifespan. By contrast, a conventional anode includes a binder that is relatively inelastic on an anode active material and may not sufficiently tolerate a change in volume of the anode active material.

In one embodiment of the present invention, an anode includes: an anode active material; a first binder coating layer on the anode active material; a second binder coating layer on the first binder coating layer; and a collector (e.g., a current collector), wherein the first binder coating layer has an elasticity higher than the second binder coating layer, and the second binder coating layer is adapted to combine (or connect) the anode active material with the collector.

Since the first binder coating layer on the anode active material has a relatively high elasticity, a change in volume of the anode active material that occurs during charging/discharging can be effectively tolerated. The second binder coating layer that is formed on the first binder coating layer is adapted to combine (or combines) the anode active material with the collector. If needed, the second binder coating layer may further include a conductive material to improve its conductivity.

In a comparative embodiment, when an anode active material is coated on a collector, the anode active material is coated in a slurry state using binders. In this case, generally, a binder that has a relatively high elasticity and a binder that is relatively inelastic are mixed to obtain various batteries having various characteristics. When these two different kinds of binders are mixed to form a mixture, as described above, the binder that is relatively inelastic is mainly present on a surface of the anode active material, and the binder that has the relatively high elasticity is found on a surface of the binder that is relatively inelastic. That is, the binder that is relatively inelastic becomes an internal layer of the comparative embodiment, and the binder that has the relatively high elasticity becomes an external layer of the comparative embodiment. Such results will be identified in more detail below with reference to Examples and Comparative Examples.

When the anode active material is a carbonaceous material, a change in volume of the anode active material during lithium ion intercalation/deintercalation is relatively small. By contrast, when the anode active material is a metal or metalloid, such as silicon, a change in volume of the anode active material can be greater than 10% of the starting volume. As a result, during repeated charging/discharging, the binder that is relatively inelastic on the surface of the metal anode active material described above can crack, thereby blocking electric contact and thus increasing resistance. Therefore, cyclic properties of a lithium battery may deteriorate.

By contrast, when the binder that has the relatively high elasticity is first coated on the anode active material (or on a surface of the anode active material) in accordance with one embodiment of the present invention, even a large change in volume of the anode active material that may occur during charging/discharging can be tolerated, because the binder layer that has the relatively high elasticity can have the elasticity to tolerate the change. As a result, cracks of the binder layer that is relatively inelastic on the binder layer that has the relatively high elasticity can be reduced or prevented.

In an anode according to an embodiment of the present invention, an anode active material contains a metal active material that can form an alloy with lithium. An anode including such anode active material is more efficient than a typical anode including an anode active material that is subjected to a large change in volume during charging/discharging.

In one embodiment of the present invention, the metal active material can be Si, Sn, Al, Ge, Pb, Bi, Sb, or the like, and combinations thereof, but is not limited thereto. That is, the metal active material can be any suitable metal that can form a suitable alloy with lithium.

In the anode according to an embodiment of the present invention, a polymer binder that forms the first binder coating layer can be styrene-butadiene rubber (SBR), acrylonitrile-butadiene rubber (NBR), butadiene rubber, isoprene rubber, polysulfide rubber, chloroprene rubber, polyurethane rubber, silicon rubber, ethylene propylene diene methylene (EPDM), acryl-based rubber, fluoroelastomer, or the like, and combinations thereof, but is not limited thereto. That is, the polymer binder can be any suitable binder that has a relatively high elasticity.

In the anode according to an embodiment of the present invention, a polymer binder that forms the second binder coating layer can be carboxy methyl cellulose, polystyrene glycols, celluloses, poly N-vinyl amides, poly acrylamides, or the like, and combinations thereof, but is not limited thereto. That is, the polymer binder can be any suitable binder that can increase viscosity of the electrode slurry and can improve an adhesive characteristic (or adhesivity) of the electrode slurry.

In the anode according to an embodiment of the present invention, the anode active material can contain one or more carbon fibers. By including the carbon fibers, the anode active material can attain high conductivity and additional elasticity. The carbon fibers can be carbon nanofibers, but is not limited thereto. In one embodiment, the carbon nanofibers have an aspect ratio greater than 10. The carbon nanofibers having the aspect ratio greater than 10 have a relatively long conducting path, and a relatively high crystallinity and are thus highly conductive. In addition, the carbon nanofibers can charge/discharge themselves so that the use of the carbon nanofibers does not lower a battery capacity of a lithium battery. Furthermore, the carbon fibers have a relatively high elasticity and changeable shape and a relatively low volume density and can tolerate a change in volume of the anode material during charging/discharging. Therefore, the carbon fiber can relieve stress that occurs at the anode during repeated charging and discharging. In addition, since the carbon fiber has the relatively high elasticity and conductivity, electrical disconnections between particles can be reduced or prevented when the particles expand and then contract. As such, besides acting as a simple filler, the carbon fiber can be used to address many of the problems of a conventional battery. The carbon fiber can be prepared using various methods. For example, carbon nano materials, such as carbon nano tubes or carbon nanofibers, having multiple structures prepared using an arc discharging method, a laser method, etc., can be used. In one embodiment of the present invention, the method used to prepare a carbon fiber is a vapor grown method, but is not limited thereto. Further, the first binder coating layer can also contain a carbon fiber.

Particularly, in an anode, an anode active material may be silicon metal, a first binder coating layer that is formed on the anode active material may contain styrene butadiene rubber, a second binder coating layer that is formed on styrene butadiene rubber may contain carboxy methyl cellulose, and a collector (e.g., a current collector) may contain copper.

In one embodiment, an anode can be prepared by molding an anode mixture material that includes the anode active material and a binder into appropriate (or predetermined) shapes. Alternatively, the anode can be prepared by coating the anode mixture material on a collector, which may be a copper foil.

More particularly, an anode material composition is prepared, and then the prepared anode material composition is directly coated on a copper collector, thereby obtaining an anode plate. Alternatively, the prepared anode material composition can be cast on a separate support to form an anode active material film, and the anode active material film is then laminated on a copper collector to thereby obtain an anode plate. However, an anode according to an embodiment of the present invention is not limited to the types described above.

In a battery having a large battery capacity, since it may be necessary to charge and discharge a great amount of current, a material having a low electrical resistance should be used. Various suitable conducting agents can be used to decrease the resistance of an electrode. Conducting agents that can used are, for example, carbon black, graphite fine particles, etc.

In one embodiment of the present invention, a lithium battery includes an anode according to an embodiment of the present invention as described above. A method of preparing the lithium battery will now be described below in more detail.

First, a cathode active material, a conductive agent, a binder, and a solvent are mixed to prepare a cathode active material composition. The cathode active material composition can be directly coated on an aluminum collector and then dried to prepare a cathode plate. Alternatively, the cathode active material composition can be cast on a separate support to form a composition film and then the composition film can be separated from the support. The separated composition film is laminated on an aluminum collector to prepare a cathode plate.

The cathode active material can be any suitable lithium-containing metal oxide. Examples of the cathode active material includes $LiCoO_2$, $LiMn_xO_{2x}$, $LiNi_{x-1}Mn_xO_{2x}$ where x=1, 2, and $Ni_{1-x-y}Co_xMn_yO_2$ where $0 \leq x \leq 0.5$ and $0 \leq y \leq 0.5$. In particular, the cathode active material can be $LiMn_2O_4$, $LiCoO_2$, $LiNiO_2$, $LiFeO_2$, $V_2O_5$, TiS, or MoS, in which lithium can be oxidized or reduced.

The conducting agent may be carbon black, etc. The binder may be a vinylidene fluoride/hexafluoropropylene copolymer, polyvinylidenefluoride, poly acrylonitrile, polymethylmethacrylate, polytetrafluoroethylene, or mixtures thereof; or a styrene butadiene rubber based polymer. The solvent may be N-methylpyrrolidone, acetone, water, etc. The amounts of the cathode active material, the conductive agent, the binder, and the solvent used can be substantially the same as those used in a conventional lithium battery.

A separator used in one embodiment of the present invention can be any suitable separator that is used in a conventional lithium battery. In particular, the separator should have a relatively low resistance to ion mobility and a relatively high electrolytic solution retaining property. Examples of the separator include glass fiber, polyester, Teflon, polyethylene, polypropylene, polytetrafluoroethylene (PTFE), and combinations thereof, and each of the examples can be a nonwoven fabric or a woven fabric. For example, a lithium ion battery can use a foldable separator formed of polyethylene or polypropylene, and a lithium ion polymer battery can use a separator having a high organic electrolytic solution retaining capability. A method of manufacturing a separator will now be described below in more detail.

A polymer resin, a filler, and a solvent are mixed to prepare a separator composition. Then, the prepared separator composition can be directly coated on an electrode, and then dried to form a separator film. Alternatively, the separator composition can be cast on a support and then dried to form a separator composition film, and the separator composition film can be separated from the support. The separated composition film is laminated on an electrode to form a separator film.

The polymer resin is used as a binder and can be any suitable material used as a binder of an electrode plate. For example, the polymer resin can be a vinylidene fluoride/hexafluoropropylene copolymer, polyvinylidenefluoride, polyacrylonitrile, polymethylmethacrylate, or mixtures thereof; or the like.

Examples of a solvent of an electrolytic solution may include propylene carbonate, ethylene carbonate, diethyl carbonate, ethyl methyl carbonate, methyl propyl carbonate, buthylene carbonate, benzonitrile, acetonitrile, tetrahydrofuran, 2-methyltetrahydrofurane, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, dimethylcarbonate, methylethylcarbonate, diethylcarbonate, methylpropylcarbonate, methylisopropylcarbonate, ethylpropylcarbonate, dipropylcarbonate, dibutylcarbonate, diethyleneglycol, dimethylether, and mixtures thereof.

Examples of an electrolyte of the electrolyte solution may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ where x and y are natural numbers, LiCl, LiI, and mixtures thereof.

The separator is sandwiched between the cathode plate and the anode plate described above to form a battery assembly. The battery assembly is wound or folded such that it can be placed in a spherical battery case or a rectangular battery case, and then an organic electrolytic solution according to an embodiment of the present invention is injected thereto. As a result, a lithium ion battery is realized.

Figure 4:
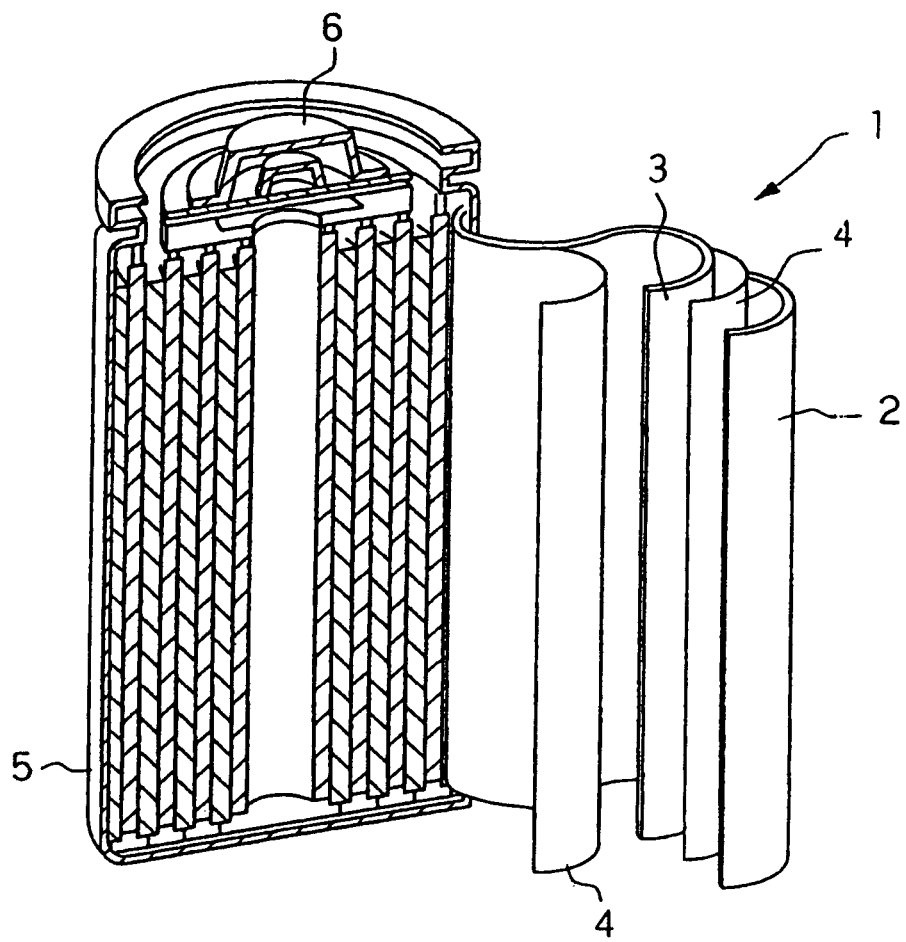
FIG. 4 illustrates a lithium battery including an anode according to an embodiment of the present invention.

Specifically, in an embodiment of the present invention as shown in FIG. 4, a lithium battery 1 is provided to include an anode 2 according to an embodiment of the present invention as described above. As shown in FIG. 4, the lithium battery 1 includes the anode 2, a cathode 3, and a separator 4 positioned between the anode 2 and the cathode 3. The anode 2, the cathode 3, and the separator 4 are wound together to form an electrode assembly. The electrode assembly is enclosed within a battery case 5 with an electrolyte, and is sealed with a cap assembly 6.

Furthermore, a plurality of the battery assemblies can be stacked in a bi-cell structure, and then immersed in an organic electrolytic solution. The obtained result is placed in a pouch and sealed. As a result, a lithium ion polymer battery is realized.

The present invention will be described in more detail with reference to the following examples. However, these examples are for illustrative purposes only and are not intended to limit the scope of the present invention.

Preparation of Anode Active Material

Preparation Example 1

0.2 g of carboxy methyl cellulose (CMC) powder was mixed with 2 g (10 wt %) of styrene butadiene rubber (SBR) solution, and then 20 mL of distilled water was added thereto. The resultant mixture was stirred using a mechanical agitator for one hour to prepare a slurry. Subsequently, 9.6 g of natural graphite powder was added to the slurry and stirred using a mechanical agitator for one hour to thereby prepare an anode active material slurry.

Preparation Example 2

9.6 g of natural graphite powder was mixed with 2 g (10 wt %) of styrene butadiene rubber (SBR) solution and stirred using a mechanical agitator for one hour to prepare a slurry. The slurry was dried in vacuum to obtain graphite powder that was coated with styrene butadiene rubber. The graphite powder that was coated with styrene butadiene rubber was mixed with 0.2 g of carboxy methyl cellulose (CMC) and then 20 mL of distilled water was added thereto. The resultant mixture was stirred using a mechanical agitator for one hour to thereby obtain an anode active material slurry.

Preparation of Anode

Example 1

1 g of silicon powder having a diameter of 43 μm was mixed with 0.6 g of graphite nanofibers, and then 2 g (10 wt %) of styrene butadiene rubber (SBR) solution was added thereto. The resultant mixture was stirred using a mechanical agitator for one hour to obtain a first slurry. The obtained first slurry was defoamed in vacuum several times to remove foam that had been formed in the first slurry to thereby obtain a second slurry having a relatively high viscosity. Then, 0.2 g of carboxy methyl cellulose (CMC) and 8 g of graphite powder used as a conductive agent were added to the second slurry and then mixed. 20 mL of distilled water was added to the resultant mixture and stirred using a mechanical agitator to thereby obtain a third slurry. The third slurry was coated on a Cu collector using a doctor blade to a thickness of about 200 μm, dried at room temperature, and then dried in vacuum at 110° C. As a result, an anode plate was realized.

Example 2

1 g of silicon powder having a diameter of 43 μm was mixed with 2 g (10 wt %) of styrene butadiene rubber (SBR) solution to obtain a first slurry. 0.6 g of graphite nanofibers were added to the first slurry and then stirred using a mechanical agitator for one hour to thereby obtain a second slurry. The second slurry was defoamed in vacuum several times to remove foam that had been formed in the second slurry to thereby obtain a third slurry. 0.2 g of carboxy methyl cellulose (CMC) and 8 g of graphite powder used as a conductive agent was added to the third slurry and then mixed. Then, 20 mL of distilled water was added to the resultant mixture and then stirred using a mechanical agitator for one hour to thereby obtain a fourth slurry.

Here, an anode plate for Example 2 was prepared with substantially the same method as in Example 1.

Comparative Example 1

1 g of silicon powder having a diameter of 43 μm was mixed with 0.6 g of graphite nanofibers, and then 0.2 g of carboxy methyl cellulose (CMC) and 8 g of graphite powder that acts as a conductive agent were added thereto and mixed. Then, 20 mL of distilled water was added to the resultant mixture and then mixed using a mechanical agitator for one hour to obtain a first slurry. 2 g of (10 wt %) of styrene butadiene rubber (SBR) solution was added to the first slurry and stirred using a mechanical agitator for one hour to thereby obtain a second slurry.

Here, an anode plate for Comparative Example 1 was prepared with substantially the same method as in Example 1

Analysis of Binder Surface

Each slurry obtained according to Preparation Examples 1 and 2 was cast on a support to a thickness of 240 μm and then separated from the support to thereby obtain a binder film that contains an anode active material. Mass analysis of surfaces of the films obtained using slurries prepared according to Preparation Examples 1 and 2, a film that was obtained using only styrene butadiene rubber (SBR), and a film that was obtained using only carboxy methyl cellulose (CMC) was carried out using TOF-SIMS (Time-of-Flight Secondary Ion Mass Spectrometry, Germany ION-TOF Co., Product Name: ION-TOF IV) based on cationic and anionic modes. The analysis results are shown in FIGS. 1 and 2.

FIG. 1 is a mass spectrograph showing results of a mass spectrometry using TOF-SIMS (cation mode) performed on surfaces of films prepared according to Preparation Examples. Referring to FIG. 1, the films obtained using the slurry prepared according to Preparation Example 1 and the styrene butadiene rubber (SBR) showed similar spectra. That is, such similarity indicates that the surface component of the film that was obtained according to Preparation Example 1 was styrene butadiene rubber. Accordingly, it was found that in the case of the slurry that was obtained according to Preparation Example 1, carboxy methyl cellulose (CMC) was mainly present at the surface of the graphite active material, and styrene butadiene rubber was mainly present at the surface of the carboxy methyl cellulose.

Figure 2:
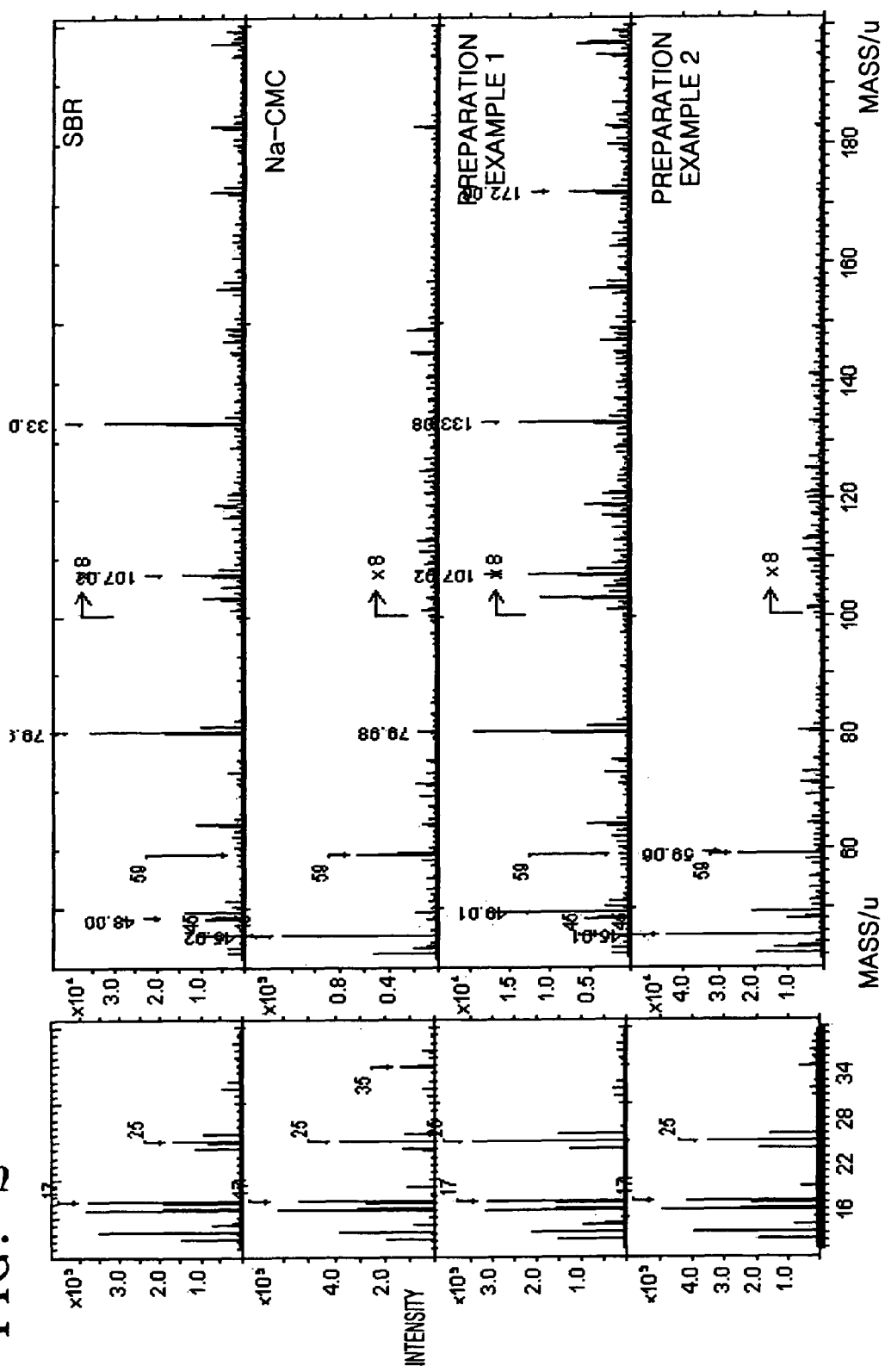
FIG. 2 is a mass spectrograph showing results of a mass spectrometry using TOF-SIMS (anion mode) performed on surfaces of films prepared according to Preparation Examples.

FIG. 2 is a mass spectrograph showing results of a mass spectrometry using TOF-SIMS (anion mode) performed on surfaces of films prepared according to Preparation Examples. Referring to FIG. 2, the films that were formed using the slurry prepared according to Preparation Example 2 and carboxy methyl cellulose showed similar spectra. That is, such similarity indicates that the surface component of the film obtained according to Preparation Example 2 was carboxy methyl cellulose. Accordingly, it was found that in the case of the slurry obtained according to Preparation Example 2, styrene butadiene rubber was mainly present at the surface of the graphite active material and carboxy methyl cellulose was mainly present at the surface of the styrene butadiene rubber.

Preparation of Lithium Battery

Example 3

A 2015-standard coin cell lithium battery was manufactured using the anode plate that had been prepared according to Example 1. The coin cell lithium battery also included a counter electrode made of a lithium metal, a PTFE separator, and an electrolyte solution including 1 M LiPF$_6$ melted in EC (ethylene carbonate) and DEC (diethyl carbonate) (3:7).

Example 4

A coin cell lithium battery was manufactured in substantially the same manner as in Example 3, except that the anode plate prepared according to Example 2 was used.

Comparative Example 2

A coin cell lithium battery was manufactured in substantially the same manner as in Example 3, except that the anode plate prepared according to Comparative Example 1 was used.

Charge/Discharge Test

Figure 3:
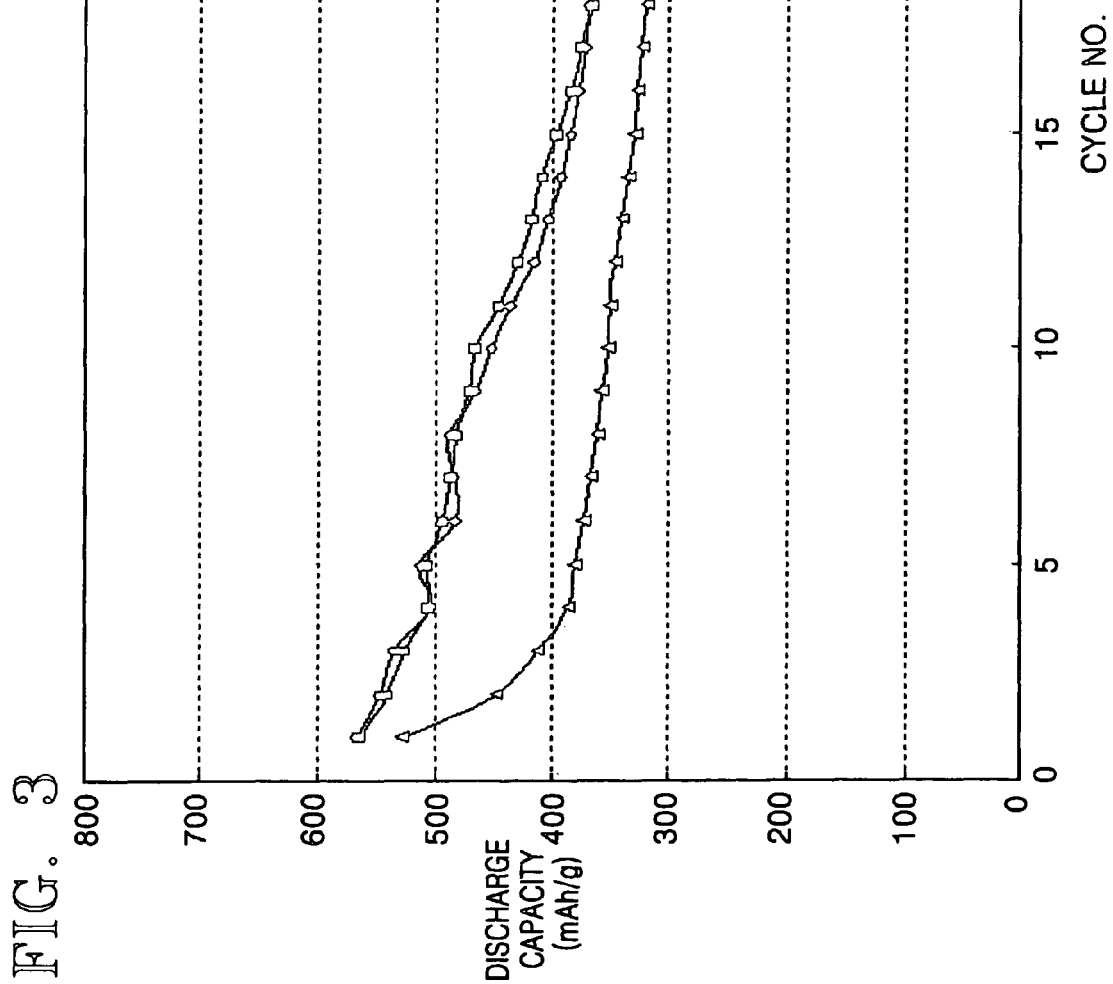
FIG. 3 is a graph showing results of a charge/discharge experiment performed on lithium batteries prepared according to Examples 3 and 4 according to embodiments of the present invention, and Comparative Example 2.

A Charge/discharge test was performed on the lithium batteries prepared according to Examples 3 and 4 and Comparative Example 2 at a rate of 0.1 C. FIG. 3 is a graph showing results of a charge/discharge experimental performed on the lithium batteries prepared according to Example 3 and 4 according to embodiments of the present invention, and Comparative Example 2. Initial discharge capacities and discharge capacities at 30 cycles for these lithium batteries are shown in Table 1.

TABLE 1

|  | Initial Discharge Capacity (mAh/g) | Discharge Capacity at 30 Cycles (mAh/g) | Capacity retention ratio after 30 Cycles (%) |
| --- | --- | --- | --- |
| Example 3 | 564 | 270 | 47.9 |
| Example 4 | 527 | 261 | 49.5 |
| Comparative Example 2 | 566 | 4 | 0.7 |

Referring to Table 1 and FIG. 3, after 30 cycles, the capacity retention ratio of the lithium batteries prepared according to Examples 3 and 4 was about 50%, but the capacity retention ratio of the lithium battery prepared according to Comparative Example 2 had substantially dropped to about 1%.

That is, in the lithium battery prepared according to Comparative Example 2 in which a polymer binder being relatively inelastic is present at the surface of a metal active material, the binder was damaged due to repeated charging/discharging and thus the metal active material was electrically disconnected with its collector, making further reversible intercalating/deintercalating of lithium ions effectively impossible. On the other hand, in each of the lithium batteries according to Examples 3 and 4 in which a polymer binder having a relatively high elasticity was present at the surface of a metal active material, a change in volume of the metal active material was sufficiently tolerated and thus the binding of the binder to the metal active material was maintained even when charging/discharging was repeated so that reversible intercalating/deintercalating of lithium ions could take place. Accordingly, the lithium batteries according to Examples 3 and 4 have a relatively long lifespan.

In an anode according to the present invention, a binder coating layer that has a relatively high elasticity formed on the surface of an anode active material can tolerate a change in volume of the anode active material. As a result, a lithium battery that uses the anode has improved cyclic properties and a relatively long lifespan.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. An anode comprising:
   an anode active material;
   a first binder coating layer on the anode active material;
   a second binder coating layer on the first binder coating layer; and
   a collector,
   wherein the first binder coating layer has an elasticity higher than that of the second binder layer, an amount of the second binder coating layer at an exterior of the anode is greater than that of the first binder coating layer, and the second binder coating layer is adapted to combine the anode active material with the collector.

2. The anode of claim 1, wherein the anode active material comprises a metal or metalloid active material capable of forming an alloy with lithium.

3. The anode of claim 2, wherein the metal or metalloid active material comprises a metal or metalloid selected from the group consisting of Si, Sn, Al, Ge, Pb, Bi, Sb, and combinations thereof.

4. The anode of claim 1, wherein the first binder coating layer comprises a polymer binder selected from the group consisting of styrene-butadiene rubber (SBR), acrylonitrile-butadiene rubber (NBR), butadiene rubber, isoprene rubber, polysulfide rubber, chloroprene rubber, polyurethane rubber, silicon rubber, ethylene propylene diene methylene (EPDM), acryl-based rubber, fluoroelastomer, and combinations thereof.

5. The anode of claim 1, wherein the second binder coating layer comprises a polymer binder selected from the group consisting of carboxy methyl cellulose, polystyrene glycols, celluloses, poly N-vinyl amides, poly acrylamides, and combinations thereof.

6. The anode of claim 1, wherein the anode active material comprises carbon fibers.

7. The anode of claim 1, wherein the first binder coating layer comprises carbon fibers.

8. The anode of claim 1, wherein
   the anode active material is a silicon anode active material,
   the first binder coating layer is a styrene butadiene rubber binder coating layer,
   the second binder coating layer is a carboxy methyl cellulose binder coating layer, and the collector is a copper collector.

9. A method of forming an anode, the method comprising:
   forming a first binder coating layer on an anode active material;
   forming a second binder coating layer on the first binder coating layer;
      wherein the first binder coating layer has an elasticity higher than that of the second binder coating layer, and the forming of the second binder coating layer on the first binder coating layer comprises forming an amount of the second binder coating layer at an exterior of the anode to be greater than that of the first binder coating layer, and
   combining the anode active material with a collector by utilizing the second binder coating layer to combine the anode active material with the collector.

10. The method of claim 9, wherein the forming of the first binder coating layer on the anode active material comprises mixing the first binder and the anode active material in a solvent.

11. A lithium battery comprising:
- an anode comprising:
  - an anode active material;
  - a first binder coating layer on the anode active material;
  - a second binder coating layer on the first binder coating layer; and
  - a collector,
  - wherein the first binder coating layer has an elasticity higher than that of the second binder layer, an amount of the second binder coating layer at an exterior of the anode is greater than that of the first binder coating layer, and the second binder coating layer is adapted to combine the anode active material with the collector;
- a cathode; and
- a separator between the anode and the cathode.

12. The lithium battery of claim 11, wherein the anode active material comprises a metal or metalloid active material capable of forming an alloy with lithium.

13. The lithium battery of claim 12, wherein the metal or metalloid active material comprises a metal or metalloid selected from the group consisting of Si, Sn, Al, Ge, Pb, Bi, Sb, and combinations thereof.

14. The lithium battery of claim 11, wherein the first binder coating layer comprises a polymer binder selected from the group consisting of styrene-butadiene rubber (SBR), acrylonitrile-butadiene rubber (NBR), butadiene rubber, isoprene rubber, polysulfide rubber, chloroprene rubber, polyurethane rubber, silicon rubber, ethylene propylene diene methylene (EPDM), acryl-based rubber, fluoroelastomer, and combinations thereof.

15. The lithium battery of claim 11, wherein the second binder coating layer comprises a polymer binder selected from the group consisting of carboxy methyl cellulose, polystyrene glycols, celluloses, poly N-vinyl amides, poly acrylamides, and combinations thereof.

16. The lithium battery of claim 11, wherein the anode active material comprises carbon fibers.

17. The lithium battery of claim 11, wherein the second binder coating layer comprises carbon fibers.

18. The lithium battery of claim 11, wherein
- the anode active material is a silicon anode active material,
- the first binder coating layer is a styrene butadiene rubber binder coating layer,
- the second binder coating layer is a carboxy methyl cellulose binder coating layer, and the collector is a copper collector.

* * * * *

UNITED STATES PATENT AND TRADEMARK OFFICE
CERTIFICATE OF CORRECTION

| | | |
|---|---|---|
| PATENT NO. | : 8,455,138 B2 | |
| APPLICATION NO. | : 11/515096 | |
| DATED | : June 4, 2013 | |
| INVENTOR(S) | : Gue-Sung Kim et al. | |

It is certified that error appears in the above-identified patent and that said Letters Patent is hereby corrected as shown below:

In the Claims

Column 12, Claim 17, line 16    Delete "second"
                                Insert -- first --

Signed and Sealed this
Ninth Day of December, 2014

Michelle K. Lee
*Deputy Director of the United States Patent and Trademark Office*